(12) United States Patent
Wakamatsu et al.

(10) Patent No.: US 10,207,376 B2
(45) Date of Patent: Feb. 19, 2019

(54) HEAT EXCHANGER

(71) Applicant: MAHLE FILTER SYSTEMS JAPAN CORPORATION, Tokyo (JP)

(72) Inventors: Shozo Wakamatsu, Fujimino (JP); Masahiro Ariyama, Yokohama (JP); Kenji Wada, Kawagoe (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 148 days.

(21) Appl. No.: 14/912,807

(22) PCT Filed: Aug. 21, 2014

(86) PCT No.: PCT/JP2014/071839
§ 371 (c)(1),
(2) Date: Feb. 18, 2016

(87) PCT Pub. No.: WO2015/025908
PCT Pub. Date: Feb. 26, 2015

(65) Prior Publication Data
US 2016/0199953 A1    Jul. 14, 2016

(30) Foreign Application Priority Data

Aug. 22, 2013  (JP) .................................. 2013-171818
May 19, 2014  (JP) .................................. 2014-102930

(51) Int. Cl.
| F28F 9/007 | (2006.01) |
| B23P 15/26 | (2006.01) |
| F28D 9/00 | (2006.01) |
| B23K 1/00 | (2006.01) |
| B23K 1/008 | (2006.01) |
| B23K 1/19 | (2006.01) |
| B23K 101/14 | (2006.01) |
| B23K 103/10 | (2006.01) |

(52) U.S. Cl.
CPC .............. *B23P 15/26* (2013.01); *B23K 1/008* (2013.01); *B23K 1/0012* (2013.01); *B23K 1/19* (2013.01);
(Continued)

(58) Field of Classification Search
CPC ...... B23P 15/26; F28F 9/0075; B23K 1/0012; B23K 2101/14; F28D 9/0037; F28D 9/005
(Continued)

(56) References Cited

U.S. PATENT DOCUMENTS

| 5,794,691 A | 8/1998 | Evans et al. |
| 2001/0007282 A1 | 7/2001 | Komoda et al. |

(Continued)

FOREIGN PATENT DOCUMENTS

| JP | 11-351765 A | 12/1999 |
| JP | 2001-012887 A | 1/2001 |

(Continued)

OTHER PUBLICATIONS

Extended European Search Report, dated May 29, 2017, 6 pages.

*Primary Examiner* — Leonard R Leo
(74) *Attorney, Agent, or Firm* — Foley & Lardner LLP

(57) ABSTRACT

An oil cooler has a core portion (1) formed of stacked core plates (5), a bottom plate (2), a second bottom plate (3) and a top plate (4), and these are brazed in a furnace. The core plate (5) has oil communication ports (13), cooling water communication ports (14) and an oil outlet port (15). The lower end core plate (5) has a boss portion (16) surrounding the cooling water communication port (14) and a boss portion (17) surrounding the oil outlet port (15). Opening portions (32, 33) opposite to the boss portions (16, 17) are formed through the bottom plate (2). Therefore, at the time of the brazing, a melted brazing material is not excessively gathered in the boss portion (16, 17) because the melted brazing material is absorbed in the opening portions (32, 33).

2 Claims, 11 Drawing Sheets

(52) U.S. Cl.
CPC ........... F28D 9/005 (2013.01); F28D 9/0037 (2013.01); F28F 9/0075 (2013.01); *B23K 2101/14* (2018.08); *B23K 2103/10* (2018.08); *F28F 2225/04* (2013.01)

(58) Field of Classification Search
USPC ................. 165/79, 167, 906; 29/890.054
See application file for complete search history.

(56) References Cited

U.S. PATENT DOCUMENTS

| | | | |
|---|---|---|---|
| 2008/0257536 A1 | 10/2008 | Kolblin et al. | |
| 2010/0006275 A1* | 1/2010 | Arvidsson | F28D 9/005 165/170 |
| 2011/0036547 A1* | 2/2011 | Christensen | F28D 9/005 165/166 |
| 2012/0325446 A1 | 12/2012 | Wakamatsu et al. | |

FOREIGN PATENT DOCUMENTS

| | | | |
|---|---|---|---|
| JP | 2002-332818 A | | 11/2002 |
| JP | 2003-042669 A | | 2/2003 |
| JP | 2003-139480 A | | 5/2003 |
| JP | 2005-090883 A | | 4/2005 |
| JP | 2007-518958 A | | 7/2007 |
| JP | 2010-002123 A | | 1/2010 |
| JP | 2010002123 A | * | 1/2010 |
| JP | 2011-7411 A | | 1/2011 |
| JP | 2012-32057 A | | 2/2012 |
| JP | 2012032057 A | * | 2/2012 |
| JP | 2013-007516 A | | 1/2013 |

\* cited by examiner

HEAT EXCHANGER

TECHNICAL FIELD

This invention relates to improvement of a heat exchanger in which a core portion formed of stacked core plates is brazed on a bottom plate which is relatively thicker than the core plate.

BACKGROUND TECHNOLOGY

As a heat exchanger such as an oil cooler, there has been known a heat exchanger in which a flow path for fluid is formed between adjacent core plates by stacking a plurality of relatively thin core plates made of an aluminium alloy, etc. In this type of heat exchanger, as disclosed in Patent Publication 1, it is general that a core portion formed of stacked core plates is brazed on a bottom plate whose plate thickness is relatively thicker than that of the core plate, and that the heat exchanger is mounted on a mating member through this bottom plate. In addition, in Patent Publication 1, it is disclosed that a configuration of a heat exchanger, in which an oil flow path and a cooling water flow path formed by a plurality of core plates are alternately disposed. Moreover, there has also been known a type of a heat exchanger in which only oil flow paths are formed by stacking a plurality of core plates, and which is accommodated in a chamber through which cooling water flows.

At the same time when brazing a plurality of core plates on each other, brazing the core plates with a bottom plate is performed by heating in a furnace in a condition in which each member has been assembled. As a supply of brazing material, there is a method that a clad material having a brazing material layer on its surface is used as a core plate and a bottom plate, or that a sheetlike brazing material is sandwiched between joint surfaces.

In Patent Publication 1, an undersurface of the core plate at the lower end (that is, a joint surface to be joined to a bottom plate) is flat. However, in case that the core plate at the lower end has some kinds of boss portions, a part that is a large gap is locally formed between the undersurface of the core plate at the lower end and a surface of the bottom plate, which become joint surfaces. Therefore, it is not preferable because a melted brazing material tends to be excessively gathered at the boss portion at the time of brazing. For example, in case that the boss portions are formed on the core plate at the lower end and on a second core plate adjacent to this so as to be joined to each other around a communication port, the boss portion of the core plate at the lower end is formed to swell upwardly so as to be away from a surface of the bottom plate. Therefore, as mentioned above, the melted brazing material tends to be gathered. In this way, if the melted brazing material of a high temperature is excessively gathered, the core plate is locally excessively heated. Therefore, to avoid thermal damage of the core plate, temperature control at the time of the brazing is extremely strictly required.

PRIOR ART REFERENCE

Patent Publication

Patent Publication 1: Japanese Patent Application Publication 2002-332818

SUMMARY OF THE INVENTION

According to this invention, in a heat exchanger in which a core portion formed of stacked core plates is brazed on a bottom plate that is relatively thicker than the core plate and in which a part of the lower end core plate joined to the bottom plate is equipped with a boss portion that is away from a reference surface of a joint therebetween, a space portion comprising a concave portion or an opening portion is provided at a position of the bottom plate that is opposite to the boss portion.

In this way, in a structure in which the space portion is provided in the bottom plate so as to be opposed to the boss portion of the core plate, a melted brazing material flows into the space portion. Therefore, the brazing material which is gathered in the boss portion tends to decrease. That is, there is suppressed a phenomenon in which the brazing material of a high temperature is excessively gathered in the boss portion.

In one of preferable embodiments of the present invention, a communication port is opened at a top surface of the above boss portion. In addition, the above boss portion is brazed to an adjacent core plate.

Even in case where such boss portion is formed on the lower end core plate, there is suppressed an excessive gathering of the melted brazing material in the boss portion. Therefore, temperature control at the time of the brazing becomes relatively easy.

It is sufficient if the above space portion is disposed at a position where the space portion can absorb the melted brazing material. In one of preferable embodiments of the present invention, the above space portion is formed into a size including a whole projection surface of the above boss portion. In another preferable embodiment, the above space portion is formed so as to be overlapped with a part of the projection surface of the above boss portion.

In addition, in another embodiment of the present invention, an outer peripheral edge of the above space portion is formed into a concave-convex shape that changes repeatedly to have a projecting portion projecting to an inner peripheral side and an concave portion set back toward an outer peripheral side. In this structure, while the projection portion projecting to the inner peripheral side supports the lower end core plate, the volume of the space portion can be largely obtained by the concave portion set back toward the outer peripheral side. For example, a circumscribed circle circumscribed on outer peripheral side vertices of the above concave portion is positioned at an outer peripheral side of the projection surface of the above boss portion.

According to this invention, in case that the lower end core plate brazed on the bottom plate has the boss portion, the high temperature, melted brazing material is not excessively gathered in the boss portion, and it is possible to suppress a local heating of the core plate caused by the brazing material. Therefore, temperature control at the time of the brazing becomes relatively easy.

MODE FOR IMPLEMENTING THE INVENTION

In the following, one embodiment of this invention is explained in detail based on the drawings.

Figure 1:
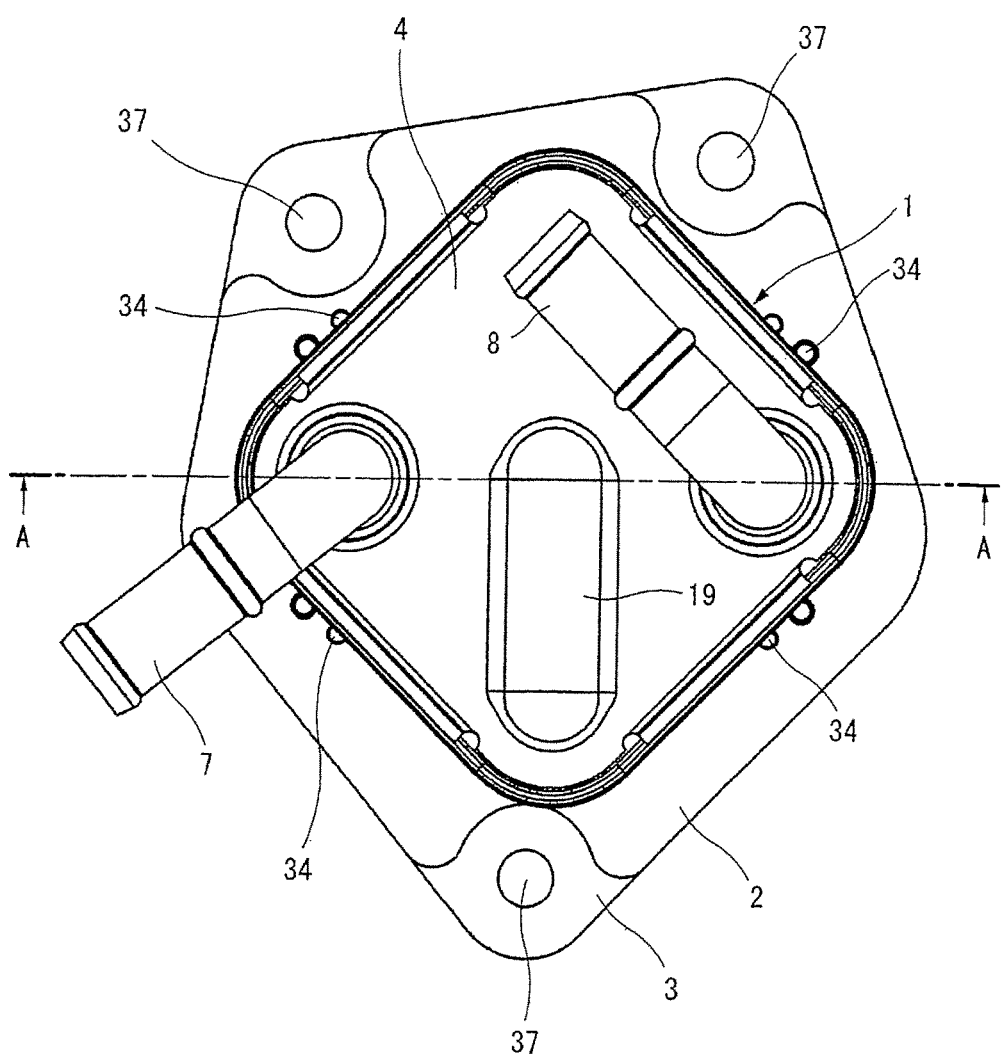
FIG. 1 is a plan view showing an oil cooler of one embodiment of this invention.
Figure 2:
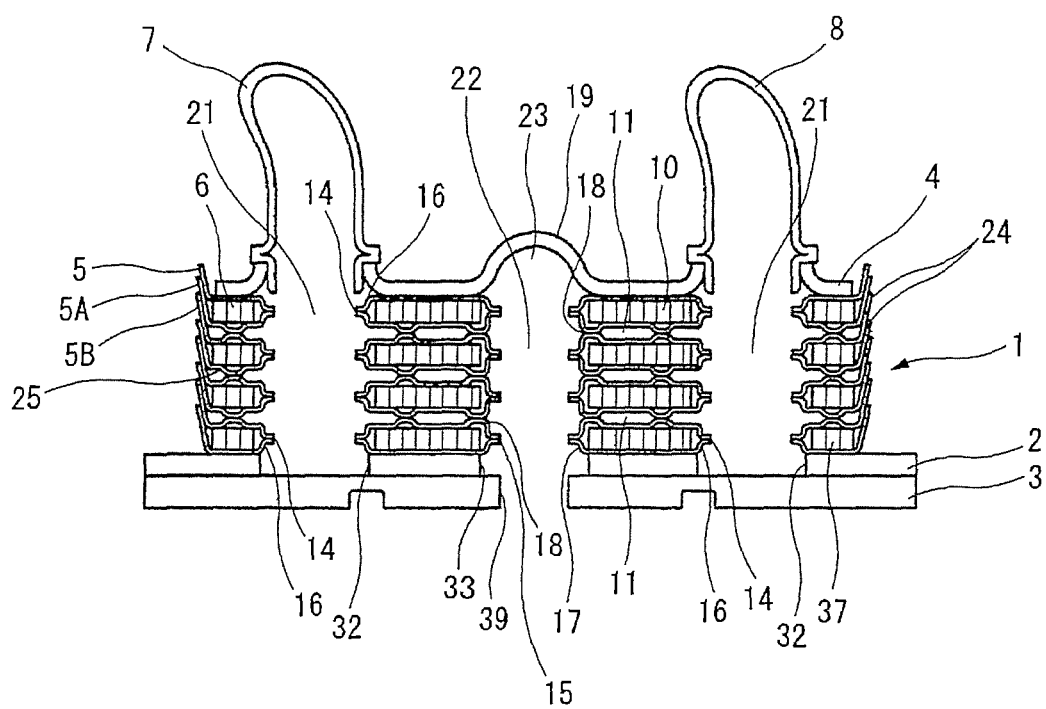
FIG. 2 is a sectional view taken along line A-A of FIG. 1

As one embodiment of a heat exchanger according to this invention, for example, FIG. 1 and FIG. 2 show an oil cooler to cool oil used for lubrication of an internal combustion engine of a car by heat exchange with cooling water. In addition, in the following, in a position of FIG. 2 used as a reference, terms of "up" and "down" are used to make understanding easy. However, when the oil cooler is actually used, it is not limited to a mounting position of FIG. 2.

The oil cooler has a structure in which a core portion 1 formed of stacked core plates 5, which have a thin plate shape, with fin plates 6 is mounted on a bottom plate 2 and a second bottom plate 3, which have relatively thick plate shapes, and in which a top plate 4 is stacked on this core portion 1. Further, a pair of connectors 7 and 8 that becomes a cooling water inlet port and a cooling water outlet port is mounted on the top plate 4. All of these components of the oil cooler are made of an aluminium based material. Each of them is integrally brazed by heating in a furnace while being supported by a jig after assembling them in a predetermined state. In addition, the heating in the furnace is performed in a position shown in FIG. 2.

Figure 3:
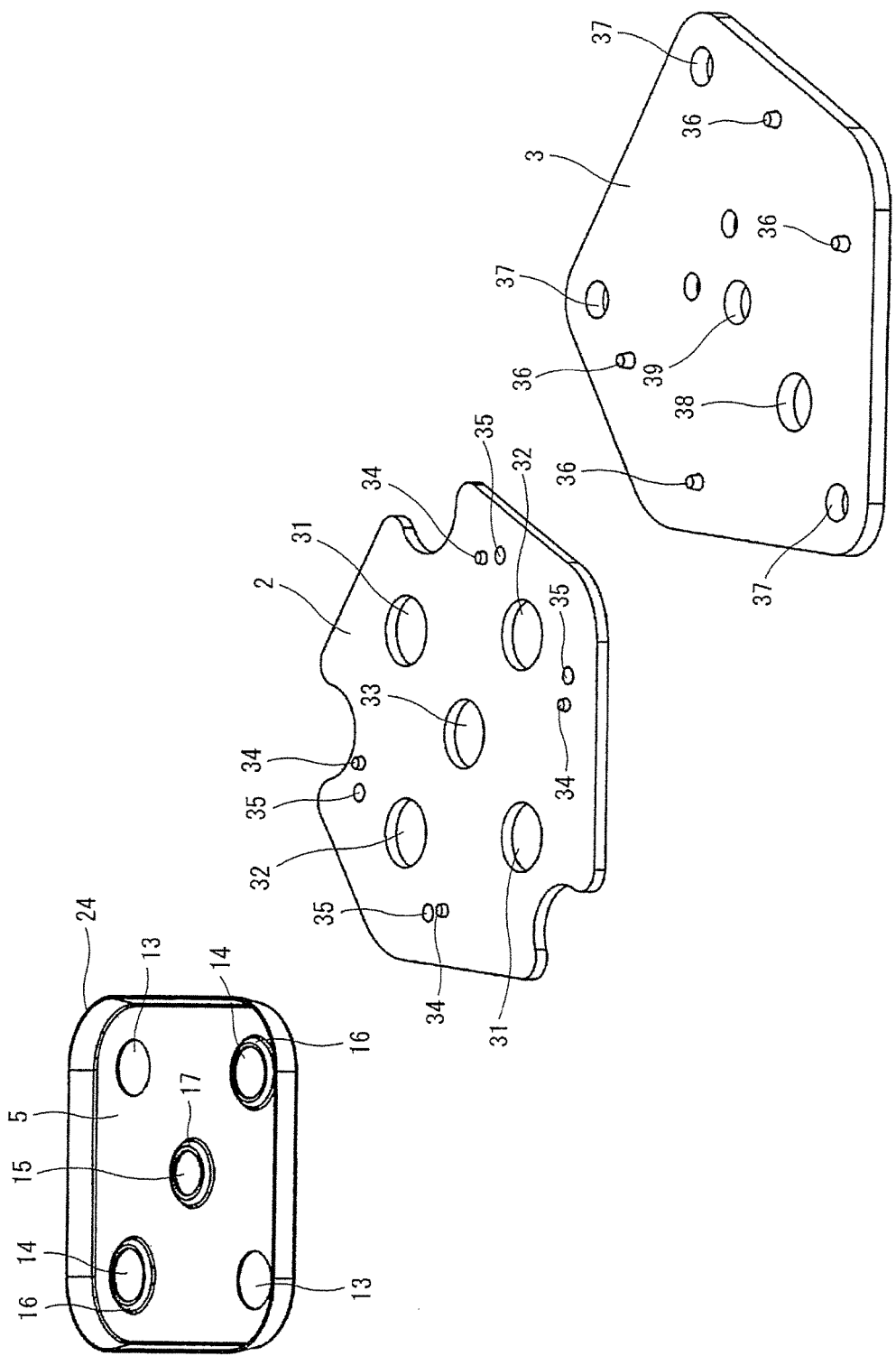
FIG. 3 is a perspective exploded view of the lower end core plate and a bottom plate.

The core portion 1 is one in which an oil passage 10 and a cooling water passage 11 are alternately formed between two adjacent core plates 5 by stacking a plurality of shallow dish shape core plates 5, which are formed into a rectangular shape whose basic shape is the same, with fin plates 6. As the core plates 5, many types of core plates 5 whose details are actually different are included, and these are properly combined. The core plates 5 are roughly divided into a lower side core plate 5A positioned at a lower side of the oil passage 10 and an upper side core plate 5B positioned at an upper side of the oil passage 10. In these core plates 5, as shown in FIG. 3, circular oil communication ports 13 are opened at two positions in a diagonal line, and circular cooling water communication ports 14 are opened at two positions in a different diagonal line. Further, in a center position of the core plate 5, a circular oil outlet port 15 is opened. In addition, in the embodiment shown in the drawings, diameter of the oil communication port 13 and diameter of the cooling water communication port 14 are equal, and diameter of the oil outlet port 15 is slightly smaller than those.

The above cooling water communication port 14 is opened in a center of a top surface of the circular boss portion 16 formed by swelling a bottom wall of the core plate 5 to one side. In other words, the boss portion 16 is formed so as to annularly surround the cooling water communication port 14. As shown in FIG. 2, in the lower side core plate 5A, the boss portion 16 projects upwardly and, in the upper side core plate 5B, the boss portion 16 projects downwardly. Their top surfaces are brazed to each other. That is, each of the boss portions 16 projects by a half amount of thickness of the oil passage 10, and they abut against and join to each other, thereby sealing the oil passage 10. With this, as a whole core portion 1, as shown in FIG. 2, a pair of cooling water flow paths 21, which communicates with the cooling water passages 11 of the steps in the stacking direction, is formed. The connectors 7 and 8 which become a cooling water inlet port and a cooling water outlet port are respectively positioned over these cooling water flow paths 21.

The oil outlet port 15 opened in the center of the core plate 5 is also similar. The oil outlet port 15 is opened in a center of a top surface of a circular boss portion 17. In other words, the boss portion 17 is formed so as to annularly surround the oil outlet port 15. In the lower side core plate 5A, the boss portion 17 projects upwardly. In the upper side core plate 5B, the boss portion 17 projects downwardly. Their top surfaces are brazed to each other. That is, similar to the boss portion 16, each of the boss portions 17 projects by a half amount of thickness of the oil passage 10, and they abut against and join to each other, thereby sealing the oil passage 10. In addition, an annular seal portion 18 is formed around the boss portion 17. In the lower side core plate 5A, this seal portion 18 projects downwardly. In the upper side core plate 5B, this seal portion 18 projects upwardly. Their top surfaces are brazed to each other. That is, each of the seal portions 18 projects by a half amount of thickness of the cooling water passage 11, and they abut against and join to each other, thereby sealing the cooling water passage 11. With this, as the whole core portion 1, as shown in FIG. 2, an oil flow path 22 extending in the stacking direction, which is isolated from both of the oil passages 10 and the cooling water passages 11, is formed. In addition, in the embodiment shown in the drawings, diameter of the boss portion 17 formed in the center is slightly smaller than diameter of the boss portion 16 of the cooling water communication port 14.

On the other hand, in the lower end core plate 5, the oil communication port 13 does not have a boss portion. As shown in FIG. 3, the oil communication port 13 is simply opened through the bottom wall of the core plate 5. However, except through the lower end core plate 5, similar to the boss portion 16 of the cooling communication port 14, a boss portion (not shown in the drawings), which annularly surrounds the oil communication port 13, is formed to seal the cooling water passage 11. That is, except the lower end core plate 5, the oil communication port 13 is opened in a center of a top surface of the circular boss portion formed by swelling the bottom wall of the core plate 5 to one side. This boss portion surrounding the oil communication port 13 projects in a direction that is opposite to the boss portion 16 surrounding the cooling water communication port 14. Specifically, in the lower side core plate 5A, the boss portion projects downwardly. In the upper side core plate 5B, the boss portion projects upwardly. Their top surfaces are brazed to each other. That is, each of the boss portions projects by a half amount of thickness of the cooling water passage 11, and they abut against and join to each other, thereby sealing the cooling water passage 11. With this, as the whole core portion 1, a pair of oil flow paths (not shown in the drawings), which communicates with the oil passages 10 of the steps in the stacking direction, is formed. In addition, in the upper end core plate 5, a swell portion 19 extending to a center of the core portion 1 from an upper side of one of the oil communication ports 13 is formed on the top plate 4. By this swell portion 19, an oil flow path 23, which communicates with the oil communication port 13 of the upper end core plate 5 and the above-mentioned oil flow path 22 formed in the center of the core portion 1, is formed.

In addition, the core plate 5 has a side wall portion 24 standing in a tapered shape at a peripheral edge of the core plate 5 and relatively small emboss portions 25 projecting toward the side of the cooling water passage 11. In the lower side core plate 5A, the emboss portion 25 projects downwardly. In the upper side core plate 5B, the emboss portion 25 projects upwardly. They abut against and join to each other to improve rigidity of the core portion 1.

In addition, the upper end core plate 5 and the lower end core plate 5 in a plurality of the core plates 5 forming the core portion 1 do not have the seal portion 18 and the emboss portion 25.

The core plate 5 and the fin plate 6 are made of a clad material in which a brazing material (for example, an aluminium base material whose melting point is lower than that of the base material) is formed on the surface of the base material made of an aluminium base material. The above opening portions such as boss portions 16 and 17, and the oil communication port 13 are formed by press forming.

On the other hand, the bottom plate 2 and the second bottom plate 3, which are positioned at an undersurface of the core portion 1, are brazed in a state in which they are stacked on each other. Each of them is formed of a plate, which is made of an aluminium base material, whose plate thickness is thicker than that of the core plate 5. In the present embodiments, these bottom plate 2 and second bottom plate 3 are not made of a clad material. They are brazed in a furnace at the same time when brazing the core portion 1 in a state in which a sheetlike brazing material is sandwiched between the undersurface of the core portion 1 and the bottom plate 2, and between the bottom plate 2 and the second bottom plate 3. In addition, the bottom plate 2 and the second bottom plate 3 can be made of a clad material.

As shown in FIG. 3, the bottom plate 2 has a pair of circular opening portions 31 corresponding to the oil communication ports 13, a pair of circular opening portions 32 corresponding to the cooling water communication ports 14 and a center circular opening portion 33 corresponding to the oil outlet port 15 in the lower end core plate 5. In addition, in the embodiment shown in the drawings, diameters of these opening portions 31, 32 and 33 are equal. Moreover, the bottom plate 2 has positioning pins 34, which engage with the side wall portion 24 of the core plate 5, disposed at four positions to set a position of the core plate 1, and it has four positioning holes 35 to set a position to the second bottom plate 3.

The second bottom plate 3 has positioning pins 36 at four positons, which engage with the above positioning holes 35, and it has installation holes 37 at three positions at a periphery of the second bottom plate 3, which are used for attachment to the side of an internal combustion engine which is not shown in the drawings. In addition, a circular oil inlet 38 is opened at a position corresponding to one of the opening portions 31 of the bottom plate 2, which corresponds to the oil communication ports 13. Moreover, a circular oil outlet 39 is opened at a position corresponding to the center opening portion 33.

Therefore, in the final assembled state of the oil cooler, oil flows into the core portion 1 from the oil inlet 38 of the second bottom plate 3, and the oil flows through a plurality of steps of the oil passages 10 in the core portion 1, and then heat exchange with cooling water is performed. After this, the oil flows to the center oil flow path 22 through the oil flow path 23 formed by the swell portion 19 formed on the top, and then returns to the oil outlet 39 of the second bottom plate 3.

Next, a relation between the boss portions 16 and 17 of the lower end core plate 5 and the opening portions 32 and 33, which is a main part of the present invention, is explained.

The lower end core plate 5 is a type of the lower side core plate 5A positioned at a lower side of the oil passage 10. As shown in FIG. 3, the circular boss portions 16 and 17 project upwardly from the bottom wall of the core plate 5, and the cooling water communication ports 14 and the oil outlet port 15 are respectively opened at top surfaces of the boss portions 16 and 17. However, the boss portion is not provided around the oil communication port 13. The oil communication port 13 is simply opened through the bottom wall of the core plate 5. In addition, in the lower end core plate 5, the cooling water communication port 14 is not necessary in function (because it is substantially sealed by the second bottom plate 3). However, in this embodiment, similar to other core plates 5, the cooling water communication port 14 is also opened through the lower end core plate 5 for standardization of the working process and enlargement of volume of the cooling water.

The opening portions 32 of the bottom plate 2 are respectively positioned under a pair of the boss portions 16. This opening portion 32 has a diameter substantially equal to that of the boss portion 16 (in particular, diameter of a peripheral edge of an undersurface side of the core plate 5). Therefore, the opening portion 32 is set to a size including the whole projection surface of the boss portion 16. The opening portion 33 of the bottom plate 2 is positioned under the center boss portion 17. This opening portion 33 has a diameter slightly larger than that of the boss portion 17 (in particular, diameter of the peripheral edge of the undersurface side of the core plate 5). Therefore, the opening portion 33 is set to a size including the whole projection surface of the boss portion 17.

In addition, a pair of the circular opening portions 31 corresponding to the oil communication ports 13 has a diameter slightly larger than that of the oil communication port 13.

As mentioned above, in a structure in which the lower end core plate 5 has the boss portions 16 and 17, when the whole oil cooler is brazed in a furnace by heating, the boss portions 16 and 17 are set back away from a reference surface of a joint (a flat surface which becomes a border between the bottom wall of the core plate 5 and the bottom plate 2) at which the lower end core plate 5 and the bottom plate 2 are joined. Thus, if the bottom plate 2 has a flat surface, a gap that is locally enlarged is formed. Therefore, a melted brazing material of a high temperature tends to be gathered excessively in this gap. However, in the structure of the above embodiment, the opening portions 32 and 33 are respectively opened opposite to the boss portions 16 and 17 through the bottom plate 2. With this, a surplus of the brazing material is gathered in the opening portions 32 and 33. Therefore, the boss portions 16 and 17 formed on the lower end core plate 5 are not locally heated by the brazing material, thereby suppressing thermal damage of the core plate 5. In particular, opening edges of the cooling water communication port 14 and the oil outlet port 15 tend to intensively receive heat. However, by the presence of the opening portions 32 and 33, the brazing material is away from the opening edges. Therefore, the opening edges do not locally turn to high temperatures.

Material of the bottom plate 2 and the second bottom plate 3 is basically the same as that of the core plate 5. However, these are thicker than the core plate 5 and their strength is higher than that of the core plate 5. Therefore, there is no problem of thermal damage caused by gathering of the brazing material of a high temperature in the opening portions 32 and 33.

In addition, in the above embodiment, the opening portion 31 is also provided at the oil communication port 13 with no boss portion. Therefore, it is also possible to keep the melted brazing material away from the opening edge of the oil communication port 13, thereby suppressing thermal damage of the opening edge.

Figure 4:
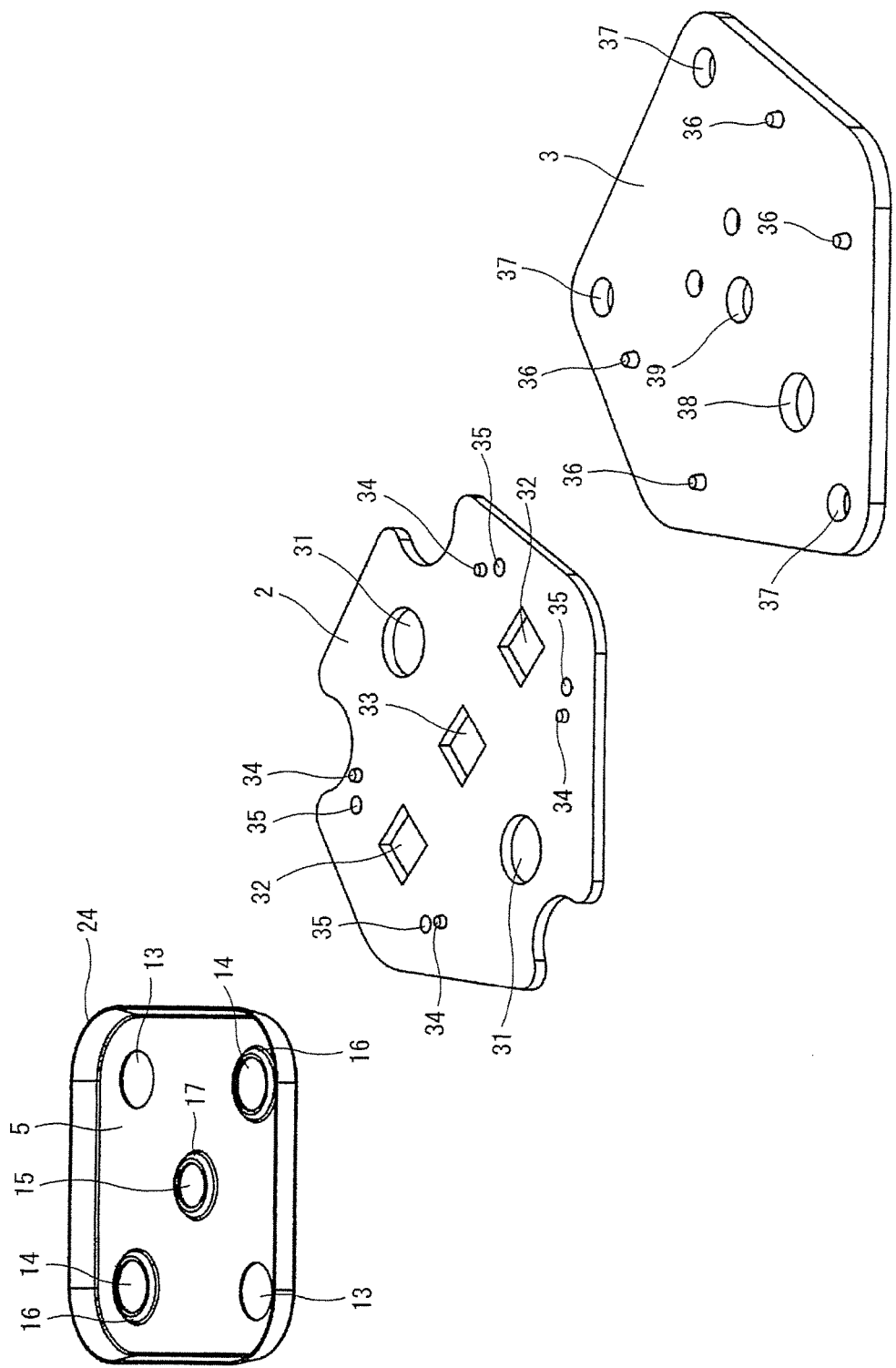
FIG. 4 is a perspective exploded view showing a modification example of the bottom plate.

Next, FIG. 4 shows a modification example in which the opening portions 32 and 33 in the bottom plate 2 are not made into circular shapes but squares. In this way, shapes of the opening portions 32 and 33 are optional as compared with the circular boss portions 16 and 17. Even if they are any kinds of shapes, if the boss portions 16 and 17 and the opening portions 32 and 33 are at least partially overlapped, the melted brazing material tends to be gathered in the opening portions 32 and 33. Therefore, the brazing material to be gathered in the boss portions 16 and 17 is reduced.

In the embodiment of FIG. 4, the three opening portions 32 and 33 have sizes equal to each other, and they are formed into squares having sizes in which the cooling water communication ports 14 are inscribed. Therefore, the opening portions 32 and 33 cover most of the projection surfaces of the boss portions 16 and 17. However, parts of the projection surfaces extend to the outsides from the opening portions 32 and 33. In these rectangular opening portions 32 and 33, there is an advantage that movement of the brazing material along circumferential directions of the boss portions 16 and 17 is suppressed.

In addition, in both of the embodiments of FIG. 3 and FIG. 4, the opening portion 32 is in a state of being closed by the second bottom plate 3. Therefore, these embodiments can be seen that a concave portion opposite to the boss portion 16 is formed of the stacked two plates 2 and 3.

Figure 5:
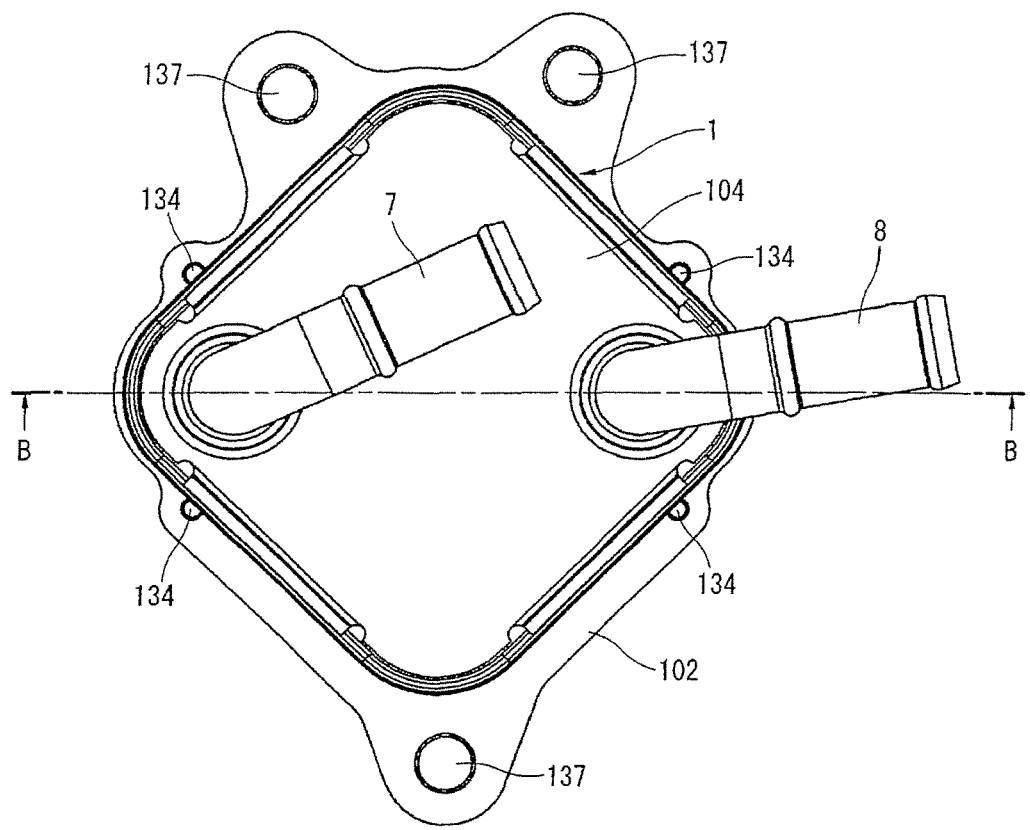
FIG. 5 is a plan view showing an oil cooler of a second embodiment.
Figure 6:
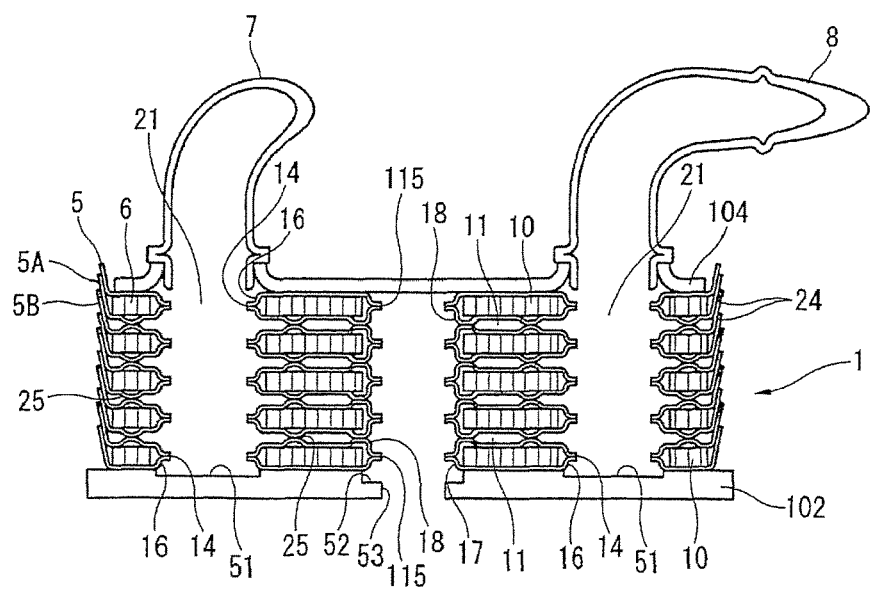
FIG. 6 is a sectional view taken along line B-B of FIG. 5.
Figure 7:
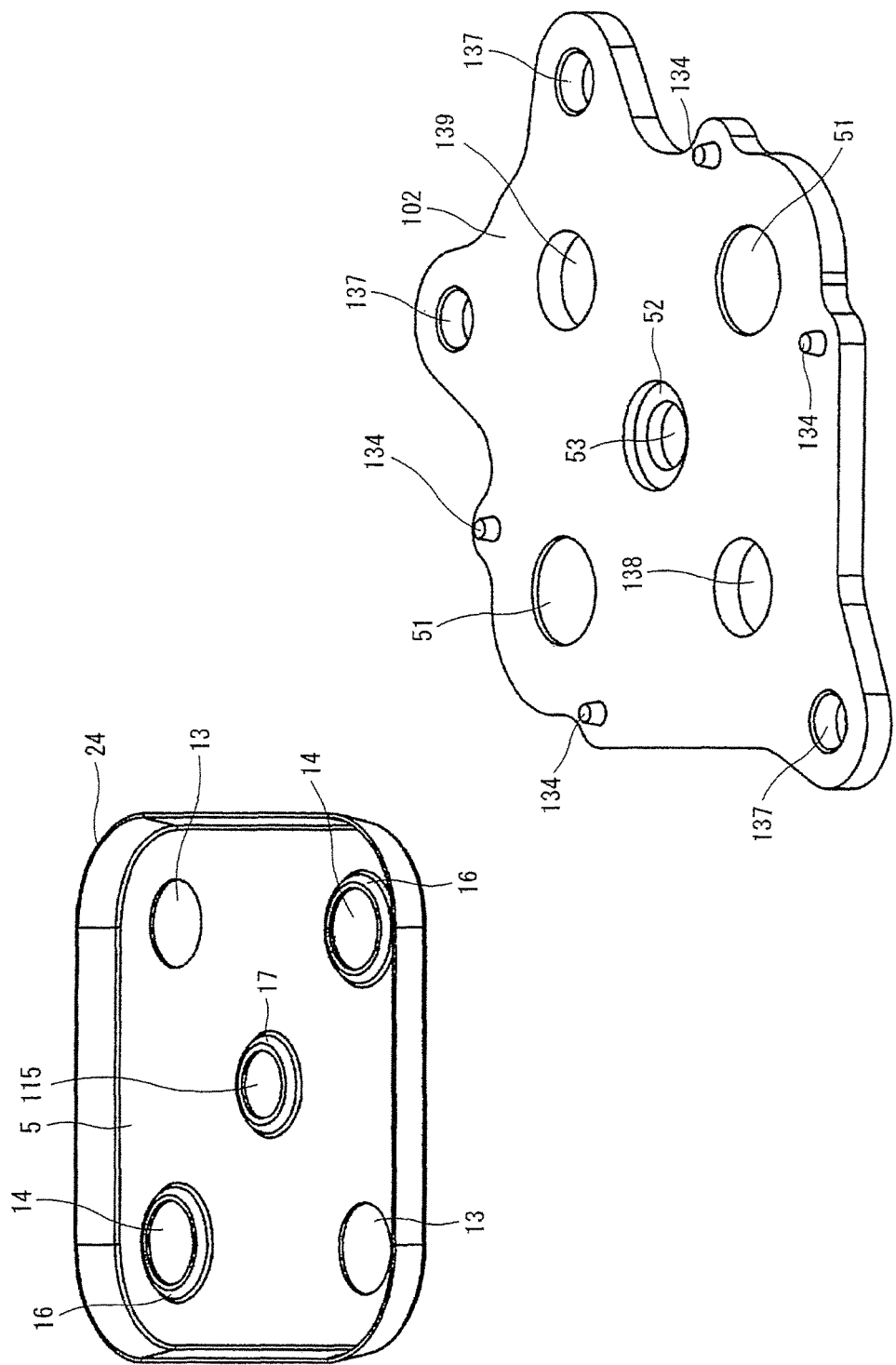
FIG. 7 is a perspective exploded view of the lower end core plate and a bottom plate.

Next, FIG. 5 to FIG. 7 show a second embodiment of the oil cooler according to this invention. In this embodiment, a structure of the core portion 1 itself is substantially the same as the above-mentioned embodiment of FIG. 1 and FIG. 2. However, the embodiment has a structure in which one of the pair of the oil communication ports 13, which are positioned on a diagonal line of the core portion 1, is used as an oil inlet passage and the other is used as an oil outlet passage. Therefore, a port 115 opened through the center of the core plate 5 is the same structure as the oil outlet port 15 of the above-mentioned embodiment as a single component. However, the port 115 does not serve as a flow path through which oil flows. Therefore, a swell portion which forms an oil flow path is not formed at a top plate 104.

In addition, in this embodiment, it is not equipped with a second bottom plate. Therefore, installation ports 137 are opened through a bottom plate 102 itself. Circular oil inlet 138 and oil outlet 139, which respectively correspond to the pair of the oil communication ports 13 of the lower end core plate 5, are opened through the bottom plate 102. A pair of circular concave portions 51 is formed in an appropriate depth on the bottom plate 102 so as to oppose to the boss portions 16 of the pair of the cooling water communication ports 14 of the lower end core plate 5. Further, a circular concave portion 52 opposite to the boss portion 17 formed in the center of the lower end core plate 5 is formed, and a circular port 53 is opened in a bottom center of this concave portion 52. In addition, the oil or the cooling water does not flow through this port 53. Moreover, positioning pins 134, which engage with the side wall portion 24 of the core plate 5 to set the position of the core portion 1, are disposed at four positions. Similar to the above-mentioned opening portions 32 and 33 of FIG. 2 and FIG. 3, the above concave portions 51 and 52 have sizes including the whole projection surfaces of the boss portions 16 and 17.

The above bottom plate 102 is also brazed onto the undersurface of the core portion 1 by using a sheetlike brazing material. The concave portions 51 and 52 are positioned under the boss portions 16 and 17. With this, similar to the above-mentioned embodiments, a surplus of the brazing material melted at the time of this brazing is absorbed by the concave portions 51 and 52. Therefore, the surplus of the brazing material of a high temperature is not excessively gathered in the boss portions 16 and 17.

In addition, the above concave portions 51 and 52 can be secondarily formed on the bottom plate 102 by machining, or they can be formed by die-forming at the same time when forming the bottom plate 102 by die-casting.

Figure 8:
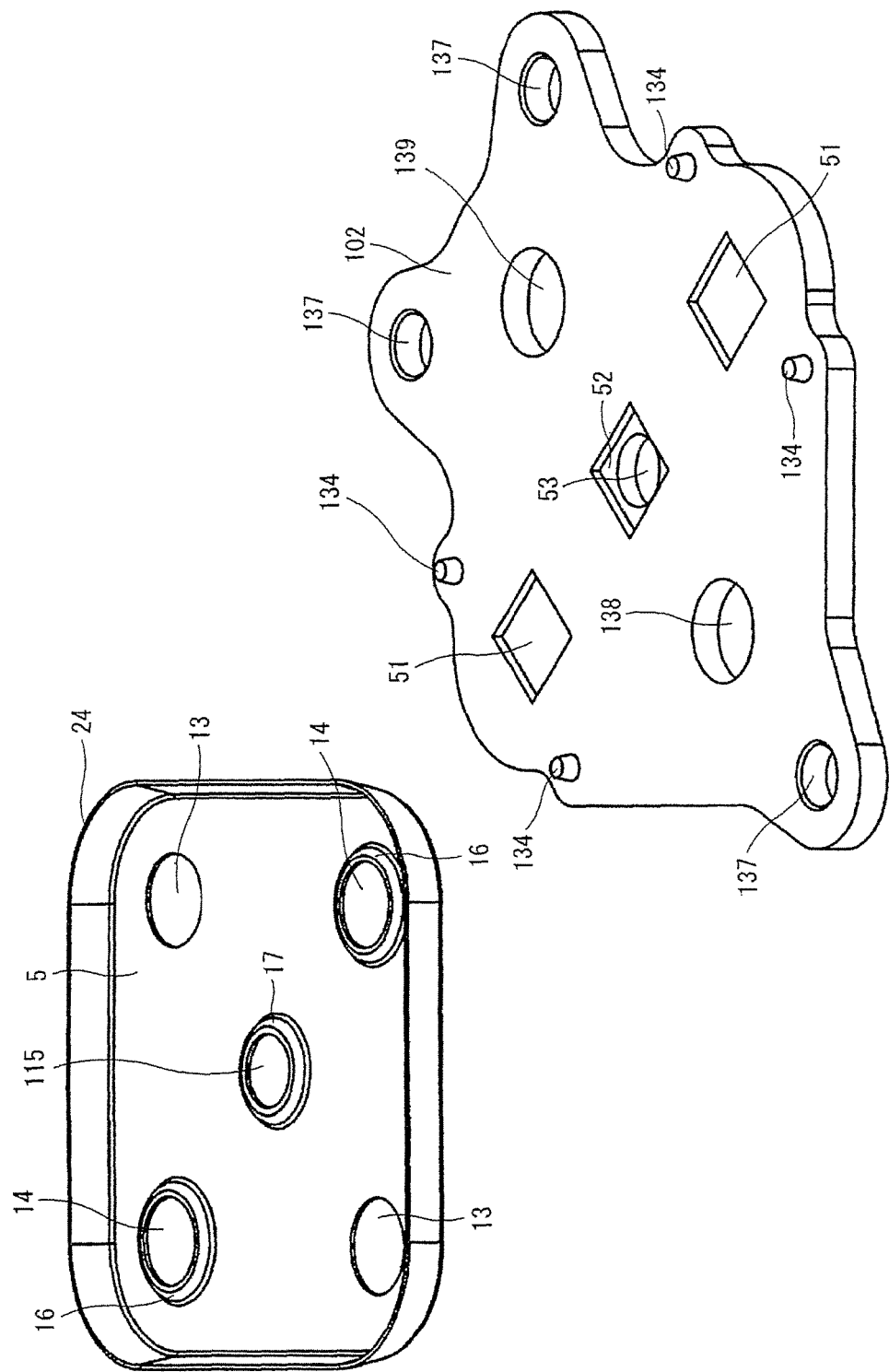
FIG. 8 is a perspective exploded view showing a modification example of the bottom plate

FIG. 8 shows a modification example of the second embodiment. The concave portions 51 and 52 are formed into squares similar to the embodiment of FIG. 4. The three concave portions 51 and 52 have sizes equal to each other. They are formed into squares having sizes in which the cooling water communication ports 14 are inscribed. Therefore, the concave portions 51 and 52 cover most of the projecting surfaces of the boss portions 16 and 17. However, parts of the projection surfaces extend to the outsides from the concave portions 51 and 52.

Figure 9:
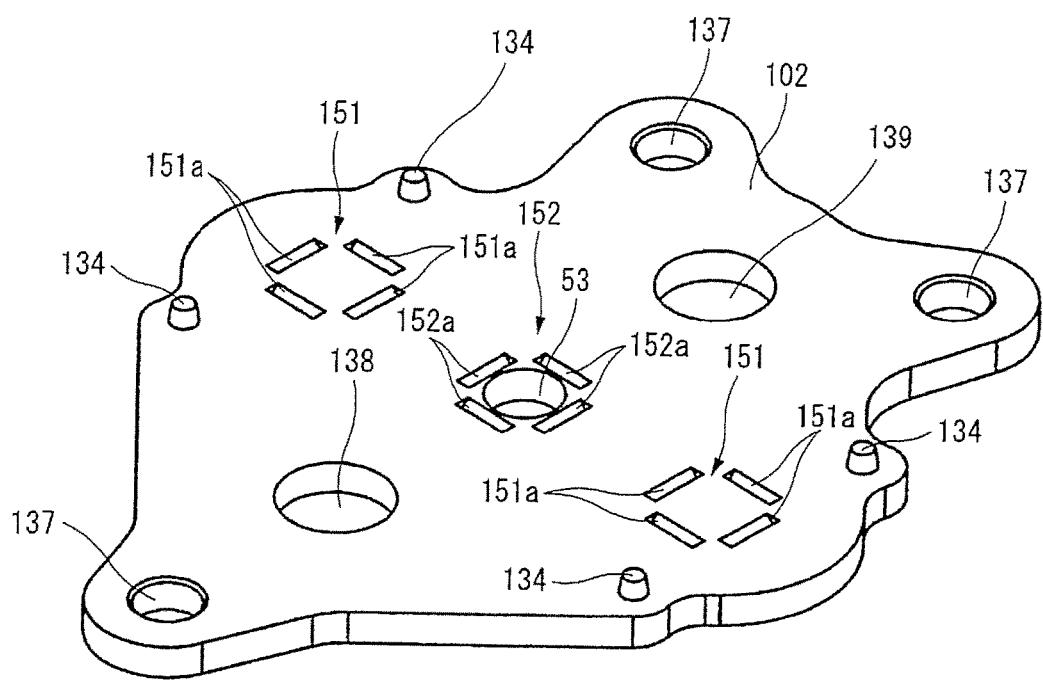
FIG. 9 is a perspective exploded view showing another modification example of the bottom plate.
Figure 10:
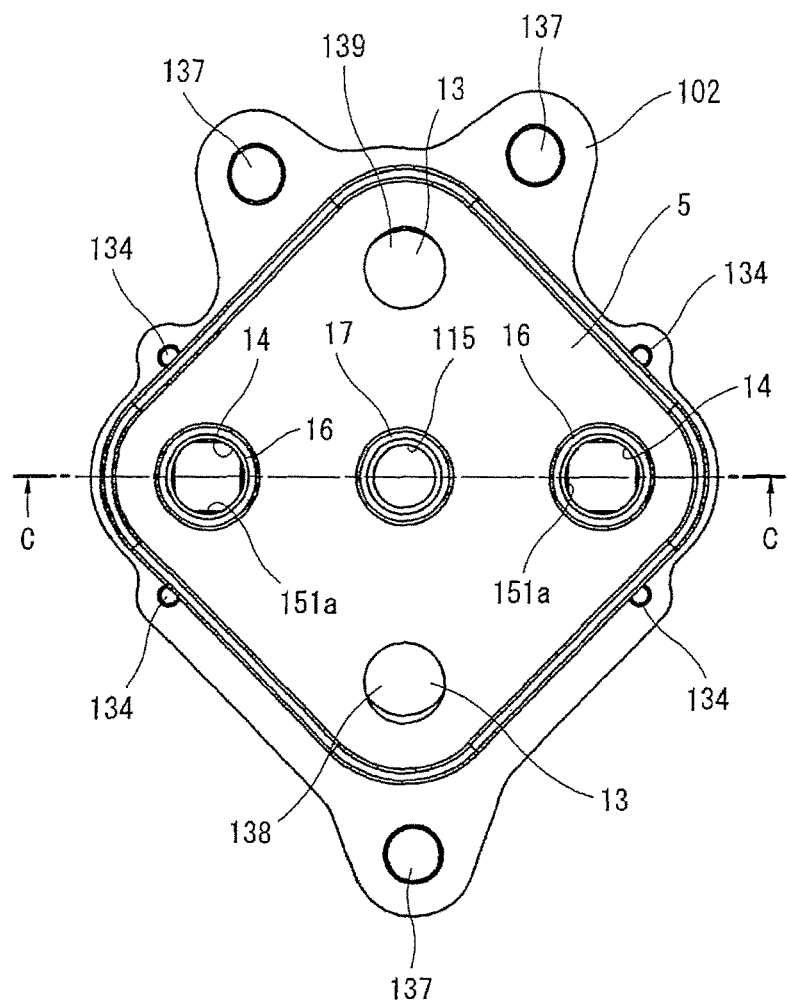
FIG. 10 is a plan view of a state in which the lower end core plate has been mounted on this bottom plate.
Figure 11:
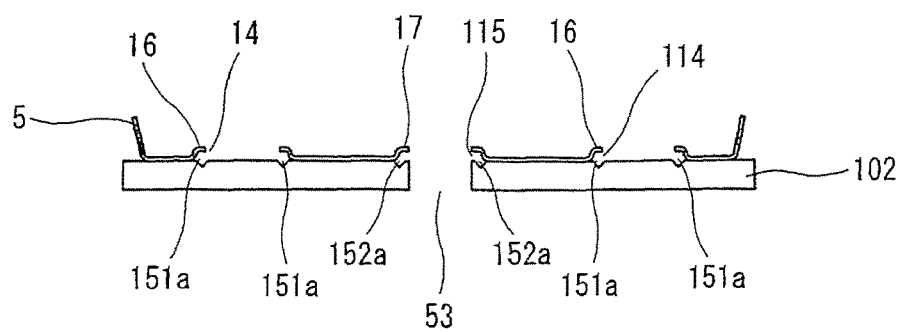
FIG. 11 is a sectional view taken along line C-C of FIG. 10.

FIG. 9 to FIG. 11 show another modification example of the second embodiment. In this embodiment, as void portions positioned under the boss portions 16 and 17, concave portions 151 and 152, which have frame shapes of squares, are formed. The concave portions 151 and 152 are respectively formed by four straight segments 151a and 152a that each correspond to each side of the squares. As shown in FIG. 11, the individual segments 151a and 152a are formed as a groove having a V-shaped section. Whole sizes of the concave portions 151 and 152 which are gathered in squares are similar to the opening portions 32 and 33 of the embodiment of FIG. 4 and the concave portions 51 and 52 of the embodiment of FIG. 8. The segments 151a and 152a are respectively provided at positions so as to become tangents to the boss portions 16 and 17. The end portions of each of the segments 151a and 152a forming four sides are discontinuous. This is an advantage that movement of the brazing material along the circumferential directions of the boss portions 16 and 17 is suppressed.

Figure 12:
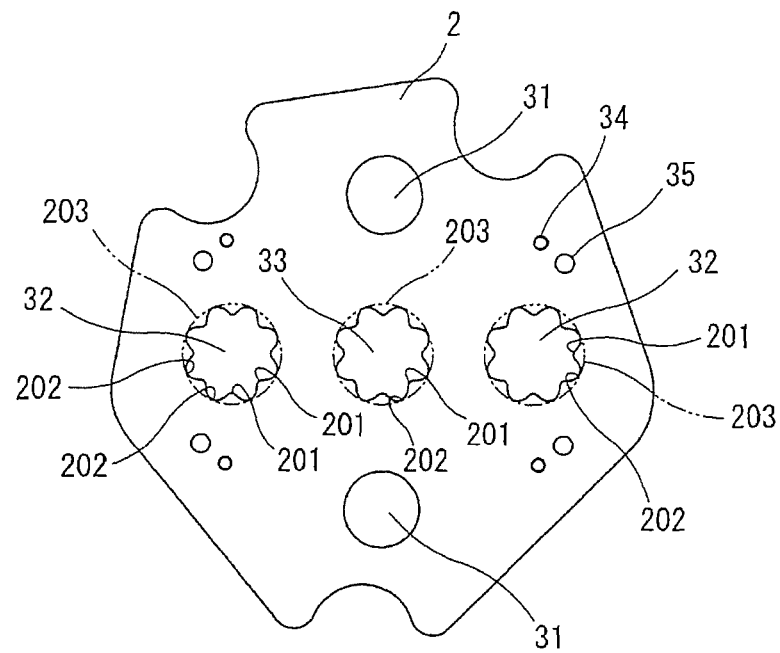
FIG. 12 is a plan view of a bottom plate used for an oil cooler of a third embodiment.
Figure 13:
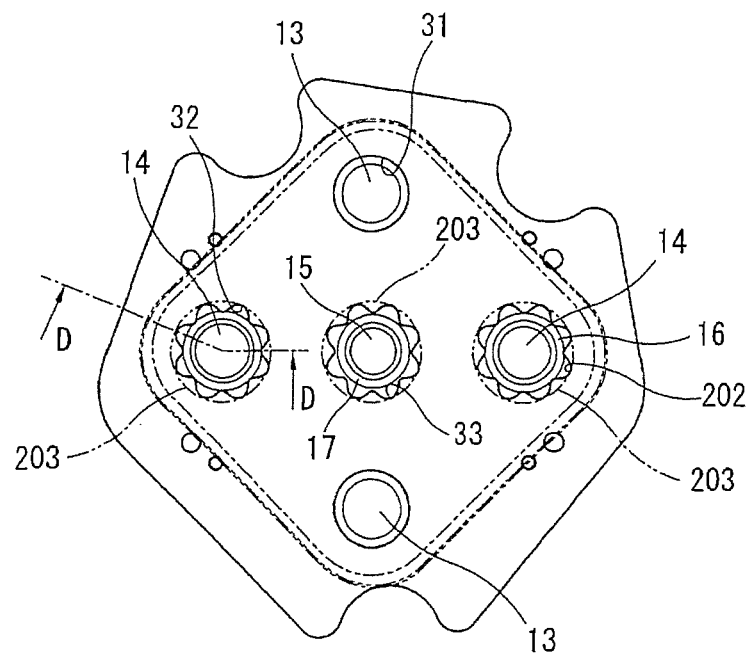
FIG. 13 is an explanation drawing showing a relation between an opening portion and a boss portion when viewed from the under surface side of the bottom plate of the third embodiment.
Figure 14:
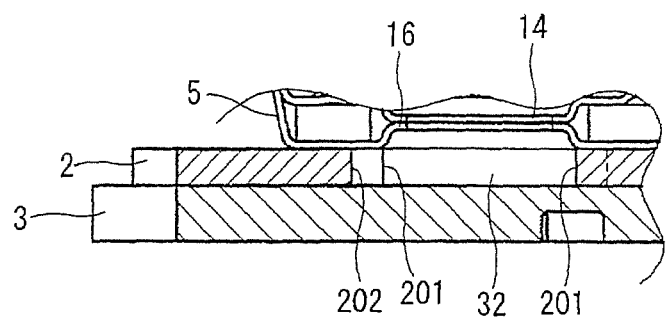
FIG. 14 is a sectional view taken along line D-D of FIG. 13.

FIG. 12 to FIG. 14 show a third embodiment of the oil cooler according to this invention. The same as the first embodiment shown in FIG. 1 to FIG. 3, this third embodiment has the bottom plate 2 and the second bottom plate 3, which are provided on the undersurface of the core portion 1. It has a base configuration similar to the first embodiment.

Therefore, as shown in FIG. 12, the pair of the circular opening portions 31 corresponding to the oil communication ports 13, the pair of the opening portions 32 corresponding to the cooling water communication ports 14, and the center opening portion 33 corresponding to the oil outlet port 15 in the lower end core plate 5 are opened through the bottom plate 2.

Here, the opening portions 32 and the opening portion 33, which respectively correspond to the pair of the boss portions 16 and the center boss portion 17 of the lower end core plate 5, are not formed into simple circular openings but gear-like opening shapes. That is, they are circular shapes as a base shape. However, their outer peripheral edges are formed into concave-convex shapes that change repeatedly to have a projecting portion 201 projecting to an inner peripheral side and a concave portion 202 set back toward an outer peripheral side. In other words, the outer peripheral edge is formed to have a wavy shape. In particular, in this embodiment, each of the projecting portion 201 and the concave portion 202 is formed into an arcuately round shape.

Further, circumscribed circles 203 circumscribed on outer peripheral side vertices of the above concave portions 202 are respectively positioned at positions corresponding to the outer peripheral sides of the projection surfaces of the boss portions 16 and 17. In addition, an inscribed circle which comes into contact with inner peripheral side vertices of the above projecting portions 201 is not shown in the drawings. However, diameters of these inscribed circles are basically equal to the diameters of the opening portions 32 and 33 of the above-mentioned first embodiment. That is, in the opening portions 32 corresponding to the pair of the boss portions 16, the diameter of its inscribed circle is substantially equal to the diameter of the boss portion 16 (in particular, diameter of a peripheral edge of an undersurface side of the core plate 5). In addition, in the opening portion 33 corresponding to the center boss portion 17, the diameter of its inscribed circle is slightly larger than the diameter of the boss portion 17 (in particular, diameter of the peripheral edge of the undersurface side of the core plate 5) (see FIG. 13).

Therefore, in case of comparing with the above-mentioned first embodiment of FIG. 1 to FIG. 3, the volume of the insides of the opening portions 32 and 33 is enlarged by a plurality of the concave portions 202. Therefore, at the time of the brazing, it is possible to hold a surplus of the brazing material. In addition, since the inner circumferences of the opening portions 32 and 33 have the concave-convex shapes, movement of the brazing material along the circumferential directions of the boss portions 16 and 17 is effectively suppressed.

On the other hand, as shown in FIG. 14, a plurality of the projecting portions 201 support circumferential parts of the boss portions 16 and 17 of the core plate 5 from the undersurface side by extending them to the inner peripheral side from the circumscribed circle 203. Therefore, support rigidity for the circumferential parts of the boss portions 16 and 17 of the core plate 5 by the bottom plate 2 can be obtained at a level equal to, for example, the first embodiment of FIG. 1 to FIG. 3. That is, by forming the outer peripheral edges of the opening portions 32 and 33 into the gear-like concave-convex shapes, the volume of the opening portions 32 and 33 can be enlarged without lowering the support rigidity for the circumferential parts of the boss portions 16 and 17 of the core plate 5.

The concave-convex shapes of the outer peripheral edges of the opening portions 32 and 33 are not limited to the shape shown in FIG. 12. If a projecting portion projecting to an inner peripheral side and a concave portion set back toward an outer peripheral side are alternately formed, any kinds of shapes can be used.

Figure 15:
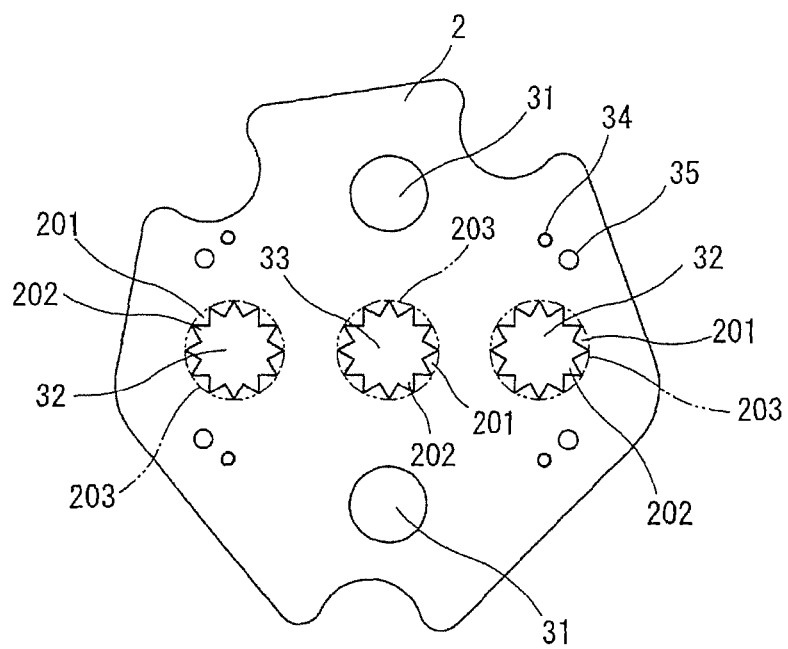
FIG. 15 is a plan view of a bottom plate showing a modification example of the third embodiment.

FIG. 15 shows one of the modification examples of a concave-convex shape of an outer peripheral edge. In this embodiment, the projecting portion 201 and the concave portion 202 are repeatedly formed in a substantially triangle by folding a straight side. In other words, the outer peripheral edge is formed into a triangular wave shape.

In the above, although one embodiment of this invention was explained in detail based on the drawings, the present invention is not limited to these embodiments, and can be modified. For example, in the above embodiments, the concave portion or a space portion having the opening portion is formed relative to the boss portion having a top surface at which the communication port, etc. is opened. However, the present invention can be also applied to a boss portion equipped with no opening. In addition, in the above embodiments, the oil passage 10 and the cooling water passage 11 are alternately formed by the stacked core plates 5. However, the present invention can also be applied to an oil cooler of a configuration in which a core portion having only an oil passage is formed by stacked core plates, and in which this core portion is accommodated in a chamber through which cooling water flows. In addition to oil coolers, the present invention can be applied to various heat exchangers.

The invention claimed is:

1. A heat exchanger, comprising:
a core portion formed of stacked core plates, and brazed on a bottom plate that is relatively thicker than each of the core plates; and
a boss portion equipped on a part of a lower end core plate joined to the bottom plate, the boss portion being away from a reference surface of a joint therebetween,
wherein a space portion comprising an opening portion is provided at a position of the bottom plate that is opposite to the boss portion, and
wherein an outer peripheral edge of the space portion is formed into a wavy shape that changes repeatedly to have a projection portion projecting to an inner peripheral side and a concave portion set back toward an outer peripheral side.

2. A heat exchanger, comprising:
a core portion formed of stacked core plates, and brazed on a bottom plate that is relatively thicker than each of the core plates; and
a boss portion equipped on a part of a lower end core plate joined to the bottom plate, the boss portion being away from a reference surface of a joint therebetween,
wherein a space portion comprising an opening portion is provided at a position of the bottom plate that is opposite to the boss portion,
wherein an outer peripheral edge of the space portion is formed into a wavy shape that changes repeatedly to have a projection portion projecting to an inner peripheral side and a concave portion set back toward an outer peripheral side of the space portion, and
wherein a circumscribed circle circumscribed on outer peripheral side vertices of the concave portion set back toward the outer peripheral side is positioned at an outer peripheral side of a projection surface of the boss portion.

* * * * *